(12) United States Patent
Luo et al.

(10) Patent No.: US 11,754,352 B2
(45) Date of Patent: Sep. 12, 2023

(54) VISIBLE LIGHT-TRANSPARENT AND RADIATIVE-COOLING MULTILAYER FILM

(71) Applicant: The Institute of Optics and Electronics, The Chinese Academy of Sciences, Sichuan (CN)

(72) Inventors: Xiangang Luo, Sichuan (CN); Xiaoliang Ma, Sichuan (CN); Mingbo Pu, Sichuan (CN); Xiong Li, Sichuan (CN); Yinghui Guo, Sichuan (CN)

(73) Assignee: The Institute of Optics and Electronics, The Chinese Academy of Sciences, Sichuan (CN)

( * ) Notice: Subject to any disclaimer, the term of this patent is extended or adjusted under 35 U.S.C. 154(b) by 443 days.

(21) Appl. No.: 16/621,892

(22) PCT Filed: Jul. 16, 2018

(86) PCT No.: PCT/CN2018/095780
§ 371 (c)(1),
(2) Date: Dec. 12, 2019

(87) PCT Pub. No.: WO2019/119787
PCT Pub. Date: Jun. 27, 2019

(65) Prior Publication Data
US 2021/0003354 A1    Jan. 7, 2021

(30) Foreign Application Priority Data
Dec. 18, 2017   (CN) .......................... 201711361964.9

(51) Int. Cl.
*F28F 13/16*    (2006.01)
*B32B 9/04*     (2006.01)

(52) U.S. Cl.
CPC ................................... *F28F 13/16* (2013.01)

(58) Field of Classification Search
CPC ............ B32B 2250/42; B32B 2250/20; B32B 2255/10; B32B 2255/20; B32B 2307/412;
(Continued)

(56) References Cited

U.S. PATENT DOCUMENTS

| 6,451,414 B1 * | 9/2002 | Wheatley ............. G02B 5/0841 359/359 |
| 2006/0267459 A1 * | 11/2006 | Shelby .................. B32B 27/322 310/358 |
| 2018/0180331 A1 * | 6/2018 | Yu .......................... B32B 27/18 |

FOREIGN PATENT DOCUMENTS

| CN | 102408806 B | 10/2013 |
| CN | 204749422 U | 11/2015 |

(Continued)

OTHER PUBLICATIONS

"Refractive Index of ITO" (https://www.filmetrics.com/refractive-index-database/ITO/Indium-Tin-Oxide-InSnO:#:~:text=For%20a%20typical%20sample%20of,nm%20are%201,85844%20and%200.0580774.) (Year: 2022).*

(Continued)

*Primary Examiner* — Maria V Ewald
*Assistant Examiner* — Daniel P Dillon
(74) *Attorney, Agent, or Firm* — POSZ LAW GROUP, PLC

(57) ABSTRACT

The present disclosure provides a visible light-transparent and radiative-cooling multilayer film, including N layers of films which have different thicknesses and are arranged alternately. The visible light-transparent and radiative-cooling multilayer film adopts a new film layer arrangement, so that the multilayer film has an extremely high visible light transmittance while achieving radiative cooling. Among others, the multilayer film is composed of two materials having high visible light-transmittance. Since there is a difference between dielectric constants of the two materials, (Continued)

a resonant cavity or resonant cavities may be formed among material layers. The resonant cavity may enhance the electric field therein, thereby increasing the radiance of the structure greatly. The present disclosure has the advantages of simple structure, easy to process, good cooling effect, high visible light transmittance and low cost.

6 Claims, 3 Drawing Sheets

(58) Field of Classification Search
CPC ........... B32B 27/08; B32B 33/00; B32B 9/04; B32B 2307/40; B32B 17/10229; F28F 13/16; F28F 2245/06; G02G 5/0825; G02B 5/288; G02B 5/287; G02B 5/282; G02B 5/00
See application file for complete search history.

(56) References Cited

FOREIGN PATENT DOCUMENTS

| | | |
|---|---|---|
| CN | 105957912 A | 9/2016 |
| CN | 205900562 U | 1/2017 |
| CN | 108099299 A | 6/2018 |
| WO | 2015/005526 A1 | 1/2015 |

OTHER PUBLICATIONS

"Refractive Index of Polymers" (https://polymerdatabase.com/polymer%20physics/Ref%20Index%20Table2%20.html) (Year: 2022).*
International Search Report of the International Searching Authority dated Sep. 28, 2018 for the corresponding International application No. PCT/CN2018/095780 (and English translation).
Office Action dated May 8, 2019 issued in corresponding CN patent application No. 201711361964.9 (and English translation).
The Extended European Search Report dated Jan. 27, 2021 issued in corresponding EP Application No. 18890786.9.
Eden Rephaeli et al, "Ultrabroadband Photonic Structures to Achieve High-Performance Daytime Radiative Cooling" Nano Letters, ACS Publications, American Chemical Society, Department of Applied Physics and Department of Electrical Engineering, Stanford University, California,USA, Published; Mar. 5, 2013.
Srinivasan Arvind et al., "Infared dielectric function of polydimethylsiloxane and selective emission behavior" Applied Physics Letters 109, Department of Mechanical Engineering, Columbia University , New York, New York, USA, AIP Publishing LLC, Published online: Aug. 10, 2016.

* cited by examiner

VISIBLE LIGHT-TRANSPARENT AND RADIATIVE-COOLING MULTILAYER FILM

CROSS-REFERENCE TO RELATED APPLICATIONS

This application is a Section 371 National Stage Application of International Patent Application No. PCT/CN2018/095780 filed on Jul. 16, 2018, which claims the priority of Chinese Patent Application No. 201711361964.9 filed on Dec. 18, 2017, the contents of which are incorporated herein by reference.

TECHNICAL FIELD

The disclosure relates to the field of radiative cooling, in particular to a visible light-transparent and radiative-cooling multilayer film.

BACKGROUND

With economic developments and society advances, power consumptions of air-conditioners take a greater proportion in total social energy consumption. Air-conditioners not only consume a lot of energy, but also release fluorochlorine during their operation, causing irreversible damage to the ozone layer. Therefore, it is urgent to find a new low-energy, pollution-free cooling technology that can replace or reduce the use of air-conditioners. By utilizing the huge temperature difference between the earth and the space the radiative cooling technology enables radiating the heat into the space in the form of infrared electromagnetic waves, thereby achieving the purpose of cooling. This technology is a passive cooling method that requires no refrigerant, so it has great application prospects.

The research on the principle, material selection and related experimental devices of radiative cooling began in the 1960s, and some progress has been made in principles and applications. For example, Biggs and Michell have built a house having a roof made of a special polytetrafluoroethylene (PTFE) sheet. When the ambient temperature is 10° C. and the indoor temperature is 5° C., the effective cooling power is 22 W/m$^2$. Erell and Ezion et al. have developed a roof pool cooling system based on solar hot plates, and analyzed the application prospects of radiative cooling. So far, such researches have only focused on the study of the radiation properties of materials in the infrared band, while ignoring the properties of materials in other bands such as the visible band. In fact, in many practical applications, the radiative-cooling material covers the target structure in the form of a coat. In particular, when being applied to cool buildings or vehicles such as cars, airplanes, and the like, the transparency of the coat in the visible band is especially important.

SUMMARY

Technical Problems

The present disclosure provides a visible light-transparent and radiative-cooling multilayer film, in which a new film layer arrangement is applied to at least partially solve the above technical problems.

Technical Solutions

According to an aspect of the present disclosure, there is provided a visible light-transparent and radiative-cooling multilayer film, characterized in comprising N layers of films, wherein the N layers of films comprise layers of first films and layers of second films arranged alternately;

wherein the layers of first films and the layers of second films are made of different visible light-transparent materials, and the visible light-transparent materials have different dielectric constants in infrared band, and a resonant cavity or resonant cavities are formed between the layers of first films and the layers of second films.

In some embodiments of the present disclosure, the N layers of films have different thicknesses.

In some embodiments of the present disclosure, the layers of first films are made of indium tin oxide, and the layers of second films are made of photoresist.

In some embodiments of the present disclosure, N≥3.

In some embodiments of the present disclosure, each of the layers of first films has a thickness of d1, wherein $0.1 \mu m \le d1 \le 1 \mu m$.

In some embodiments of the present disclosure, each of the layers of second films has a thickness of d2, wherein $1 \mu m \le d2 \le 3 \mu m$.

In some embodiments of the present disclosure, the photoresist is positive photoresist or negative photoresist.

In some embodiments of the present disclosure, the photoresist has a refractive index of n1 in visible band, wherein $1.3 \le n1 \le 1.8$.

In some embodiments of the present disclosure, the indium tin oxide has a refractive index of n2 in visible band, wherein $1.7 \le n2 \le 2.1$.

Beneficial Effects

It can be seen from the above technical solutions that the visible light-transparent and radiative-cooling multilayer film of the present disclosure has at least the following beneficial effects:

the radiative-cooling multilayer film of the present disclosure, which is formed by alternately arranging materials having high transmittance in visible band, may have advantages of simple structure, easy to process, good cooling effect, high visible light transmittance and low cost.

DETAILED DESCRIPTION

The present disclosure provides a visible light-transparent and radiative-cooling multilayer film, in which a new film layer arrangement is adopted, so that the multilayer film has an extremely high visible light transmittance while achieving radiative cooling.

In the first exemplary embodiment of the present disclosure, a visible light-transparent and radiative-cooling multilayer film is provided. In order to achieve the above object, the technical solution of this embodiment provides a visible light-transparent and radiative-cooling multilayer film comprising N layers of films with different thicknesses. The N layers of films with different thicknesses are alternately arranged indium tin oxide (ITO) film layers and photoresist film layers. Since there is a difference between dielectric constants of the two materials, a resonant cavity or resonant cavities may be formed among material layers. The resonant cavity may enhance the electric field therein, thereby increasing the radiance of the structure greatly.

Among others, N≥3.

Among others, each of indium tin oxide layers has a thickness of d1, wherein 0.1 μm≤d1≤1 μm, and each of the photoresist layers has a thickness of d2, wherein 1 μm≤d2≤3 μm.

Among others, the photoresist is positive photoresist or negative photoresist.

Among others, the photoresist has a refractive index of n1 in visible band, wherein 1.3≤n1≤1.8; the indium tin oxide has a refractive index of n2 in visible band, wherein 1.7≤n2≤2.1.

To make the objectives, technical solutions, and advantages of the present disclosure more clear, the present disclosure will be further described in detail below in conjunction with the specific embodiments by referring to the accompanying drawings.

Some embodiments of the disclosure will be described more fully hereinafter with reference to the appended drawings, in which only a part of but not all of the embodiments will be shown. In fact, the various embodiments of the disclosure may be embodied in many different forms and should not be construed as limited to the embodiments set forth herein; rather, these embodiments are provided so that the disclosure meets applicable legal requirements.

Figure 1:
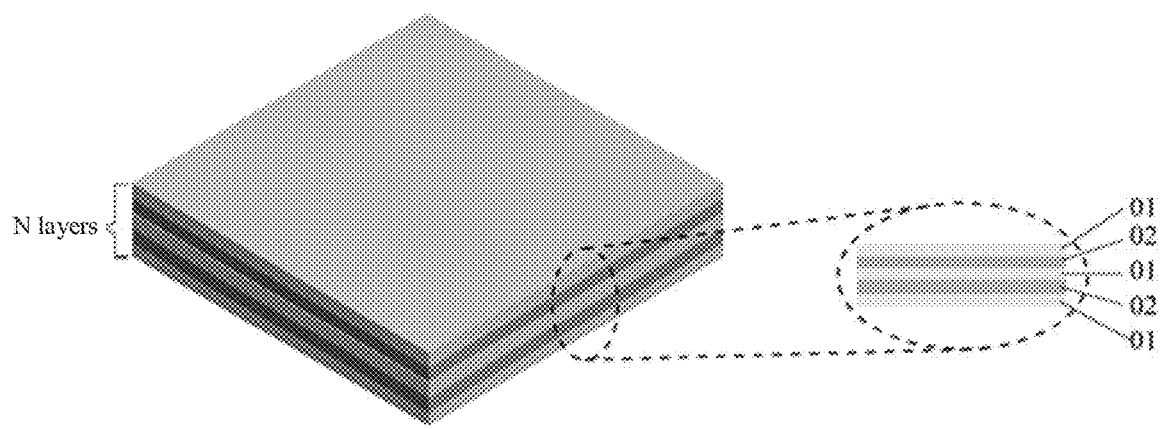
FIG. 1 is a schematic structural view of the present disclosure, wherein the material indicated by 01 is photoresist, and the material indicated by 02 is indium tin oxide.

As shown in FIG. 1, the visible light-transparent and radiative-cooling multilayer film comprises indium tin oxide film layers 02 and photoresist film layers 01 with different thicknesses, wherein the indium tin oxide film layers 02 and photoresist film layers 01 are alternately arranged in N layers.

In order to further understand the design principle of the visible light-transparent and radiative-cooling multilayer film, the present disclosure will be described below in conjunction with the principle of radiative cooling and specific embodiments.

First of all, "radiative cooling" means that objects on the ground achieve cooling by emitting their heat into the space of the universe in the form of electromagnetic waves through thermal radiation. In fact, not all frequencies of electromagnetic waves can be radiated outside the Earth, since the Earth is surrounded by the atmosphere and gases such as water vapor, carbon dioxide and ozone in the atmosphere may absorb electromagnetic waves at specific wavelengths. The frequency range with a relatively high atmospheric transmittance is referred to as "atmospheric window". Radiative cooling can be achieved only when the object radiates at a frequency within the atmospheric window. The atmospheric windows between 8-14 μm is generally concerned, since the wavelengths of black body radiation at normal temperature are mainly in this band.

Therefore, when designing a radiative-cooling multilayer film, the multilayer film is required to have an extremely high radiance at 8-14 μm.

Embodiments

Figure 2:
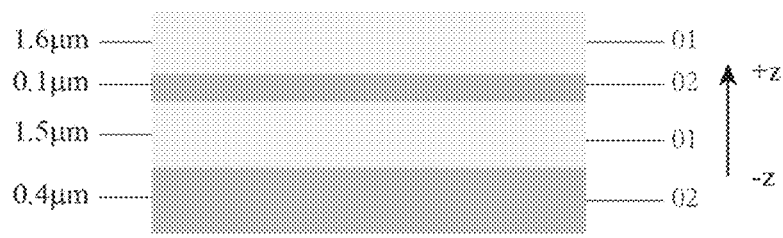
FIG. 2 shows the thickness and material of each of the multilayer film described in the first embodiment of the present disclosure.
Figure 3:
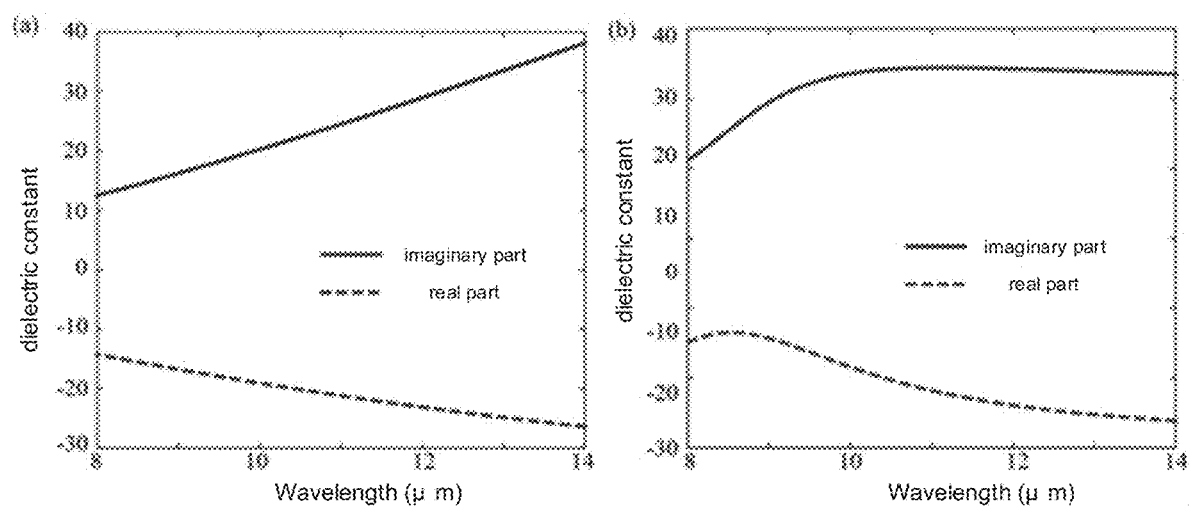
FIG. 3 shows the parameters of indium tin oxide and the photoresist in the infrared band, which are used to simulate the first embodiment of the present disclosure, wherein (a) is the parameter of indium tin oxide, and (b) is the parameter of the photoresist.

This embodiment designed a visible light-transparent and radiative-cooling multilayer film comprising N layers of films, wherein N=4. FIG. 2 shows the thickness and material of each of the multilayer film described in the first embodiment of the present disclosure. By designing the thicknesses of different material layers, the radiance of the multilayer film can be greatly increased compared to original materials, thereby enabling the radiative cooling. The photoresist in this embodiment is a commercial photoresist NR5-8000. The parameters in the infrared band of indium tin oxide and the photoresist used in the simulation are shown in FIG. 3. The parameters are experimentally measured, wherein FIG. 3(*a*) is the parameter of indium tin oxide, and FIG. 3(*b*) is the parameter of the photoresist.

Figure 4:
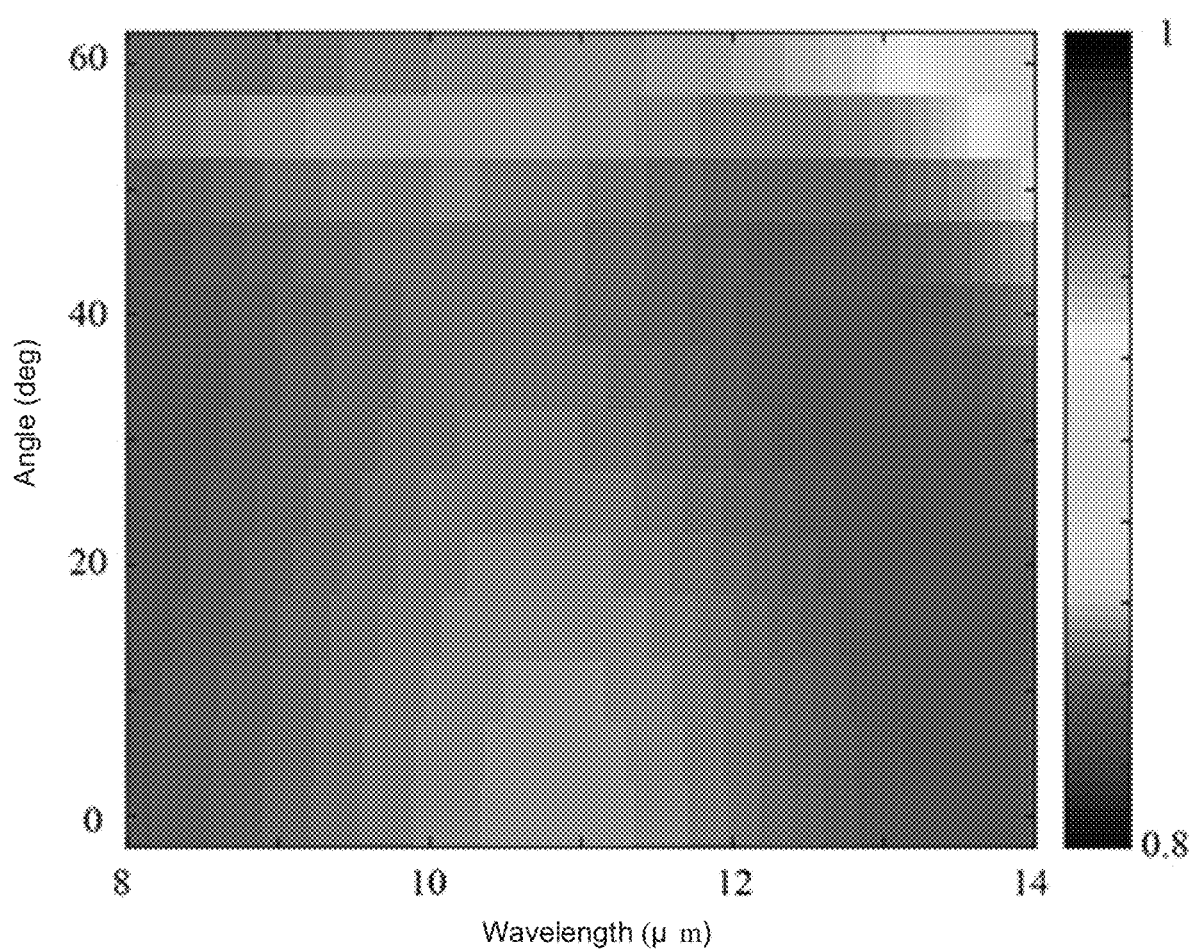
FIG. 4 shows the absorptivity of the multilayer film described in the first embodiment of the present disclosure at different angles.

First, the radiance of the multilayer film in the infrared band is simulated, wherein the propagation of the incident field is directed from −z to +z. The absorptivity of the multilayer film at different angles is obtained by electromagnetic simulation software, as shown in FIG. 4. Based on Kirchhoff's law of thermal radiation, the absorptivity of an object is equal to its radiance under a thermal equilibrium state, thus, the absorptivity obtained by simulation is considered to be the radiance of the multilayer film under a thermal equilibrium state. As shown in FIG. 4, the multilayer film has the radiance greater than 90% in the infrared band range of 8-14 μm.

Figure 5:
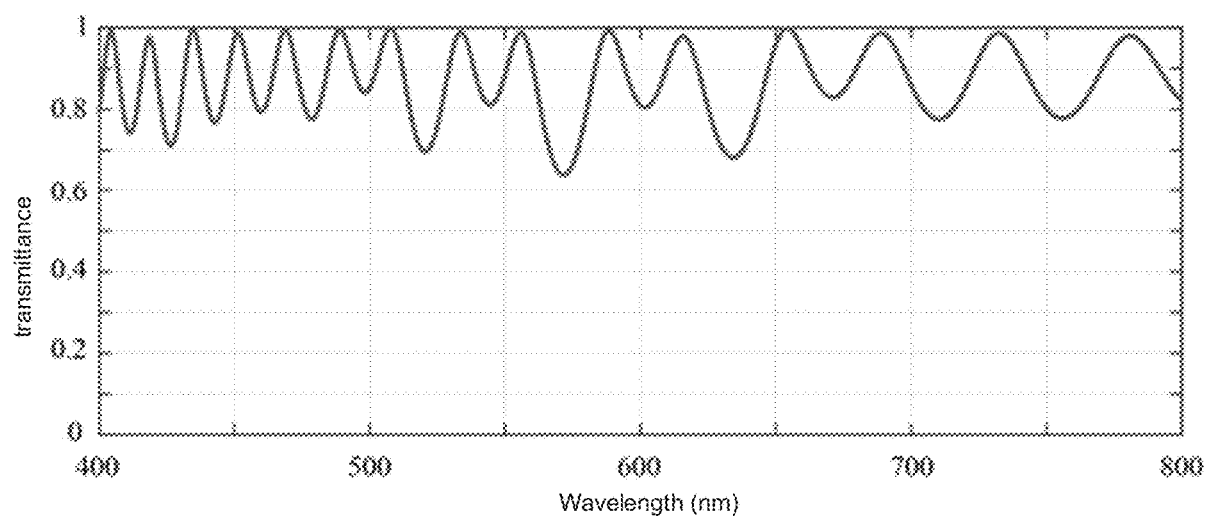
FIG. 5 is a graph showing the transmittance of the multilayer film of the present disclosure in the visible band.

In order to explain the transparency of the multilayer film in the visible band, the transmittance of the multilayer film in the visible band is simulated by simulation software, as shown in FIG. 5. In the simulation, the refractive index n1 of the photoresist is 1.6, and the refractive index n2 of indium tin oxide is 1.8. As shown in FIG. 5, the multilayer film has a high transparency in the visible band, and the average transmittance of the multilayer film in the visible band is calculated to be 87%.

Further, in order to explain the cooling effect of the multilayer film, the cooling power of the multilayer film is simulated based on the results described above. The cooling power of the multilayer film is defined as P=P1−P2, wherein P1 is the power of radiating heat via the multilayer film, and P2 is the power of absorbing heat by the multilayer film from the external environment. P1 and P2 satisfy the following formulas respectively:

$$P1 \int d\Omega \cos\theta \Omega_{21}{}^{22} d\lambda I_{BB}(T,\lambda) \varepsilon(\lambda,\theta)$$

$$P2 \int d\Omega \cos\theta \Omega_{21}{}^{22} d\lambda I_{BB}(T,\lambda) \varepsilon(\lambda,\theta) \varepsilon_{atm}(\lambda,\theta)$$

wherein $\lambda_1=8$ μm, $\lambda_2=14$ μm, T is ambient temperature; $I_{BB}$ is the blackbody radiation formula expressed by:

$$I_{BB}(T,\lambda) = \frac{2hc^2}{\lambda^5} \frac{1}{e^{hc/(\lambda k_B T)} - 1}$$

wherein, $h=6.626\times10^{-34}$ Js is the Planck constant, c represents for the speed of light in vacuum which is $2.998\times10^8$ m/s, $k_B$ represents for the Boltzmann constant which is $1.38\times10^{-23}$ J/K, and λ is the corresponding wavelength. $\int d\Omega$ represents for integral on sphere, actually, on hemisphere, $\int d\Omega = 2\pi \int_0^{\pi/2} d\theta \sin\theta$. $\varepsilon_{atm}(\lambda,\theta)=1-t(\lambda)^{1/\cos\theta}$ represents for the radiance of the external environment to the multilayer film, and t(λ) is the transmittance of the atmospheric window at different wavelengths. Table 1 gives the cooling power per unit area of the multilayer film at different ambient temperatures.

TABLE 1

Cooling power per unit area of the multilayer film at different ambient temperatures

| Ambient temperature (K) | Cooling power per unit area (W/m$^2$) |
|---|---|
| 263 | 72.44 |
| 273 | 87.47 |
| 283 | 104.27 |
| 300 | 137.16 |

It can be seen by theoretical calculation that the multilayer film has excellent radiative cooling characteristics.

The above design process, embodiment and simulation results prove the effects of the present disclosure well.

Heretofore, the embodiments of the present disclosure have been described in detail in conjunction with the accompanying drawings. It should be noted that the implementations not shown or described in the drawings or the specification are all known to those of ordinary skill in the art, and are not described in detail. In addition, the above definitions of the various elements and methods are not limited to the specific structures, shapes or manners mentioned in the embodiments, and those skilled in the art can simply modify or replace them.

It should also be noted that the directional terms mentioned in the embodiments, such as "upper", "lower", "front", "back", "left", "right", and the like, are only referred to the directions of the drawings, and not used to limit the scope of the present disclosure. The same elements are denoted by the same or similar reference numerals throughout the drawings. Conventional structures or configurations are omitted when they may cause confusion to the understanding of the present disclosure.

The shapes and sizes of the various components in the drawings do not reflect their true size and proportions, but merely illustrate the contents of the embodiments of the present disclosure. In addition, in the claims, any reference signs placed between parentheses shall not be construed as a limitation.

Unless otherwise defined, numerical parameters in the present specification and the appended claims are approximations, and can vary depending upon the desired characteristics obtained through the teachings of the disclosure. In particular, all numbers representing for the composition contents, reaction conditions, and the like, which are used in the specification and claims, are to be understood as being modified by the term "about" in all cases. In general, such numbers are meant to include a certain amount of variation of ±10% in some embodiments, ±5% in some embodiments, ±1% in some embodiments and ±0.5% in some embodiments.

The word "comprising" does not exclude the presence of the elements or steps that are not recited in the claims. The word "a", "an" or "one" before the element does not exclude the presence of a plurality of such elements.

The ordinal numbers used in the specification and claims (such as "first", "second", "third" and the like) are used to modify the corresponding elements, and do not in themselves mean that the elements have any ordinal numbers. They do not represent the order of one element and another element, or the order of a manufacturing method. They are only used to clearly distinguish one element with a certain name from another element with the same name.

Similarly, it is understood that, in order to simplify the present disclosure and to help understanding one or more of the various aspects, in the above description of the exemplary embodiments of the present disclosure, the various features of the present disclosure are sometimes grouped together into a single embodiment, figure, or a description thereof. However, the method disclosed is not to be interpreted as reflecting the intention that the present disclosure as claimed requires more features than those specifically recited in the claims. Rather, as reflected in the following claims, the disclosed aspects are to be less than all features of the single embodiments disclosed above. Therefore, the claims following the specific embodiments are hereby explicitly incorporated into the specific embodiments, and each of the claims can be considered as a separate embodiment of the present disclosure.

The specific embodiments described above further illustrate the purpose, technical solutions and beneficial effects of the present disclosure. It should be understood that the above description is only specific embodiments of the present disclosure and is not used to limit the present disclosure. Any modification, equivalent replacement, and improvement made within the spirit and principle of the present disclosure shall fall within the scope of the present disclosure.

We claim:

1. A visible light-transparent and radiative-cooling multilayer film comprising N layers of films, wherein the N layers of films comprise layers of first films and layers of second films arranged alternately;

wherein the layers of first films and the layers of second films are made of different visible light-transparent materials, and the visible light-transparent materials have different dielectric constants in infrared band, and a resonant cavity or resonant cavities are formed between the layers of first films and the layers of second films, wherein the N layers of films have layers of materials with different thicknesses, wherein each of the layers of first films has a thickness of d1, wherein 0.1 μm≤d1≤1 μm, wherein each of the layers of second films has a thickness of d2, wherein 1 μm≤d2≤3 μm, wherein the layers of first films are made of indium tin oxide, and the layers of second films are made of photoresist, wherein the layers of first films include a thickest layer, the layers of second films include a least thick layer, the thickness of the thickest layer is less thick than the thickness of the least thick layer.

2. The visible light-transparent and radiative-cooling multilayer film of claim 1, wherein N≥3.

3. The visible light-transparent and radiative-cooling multilayer film of claim 1, wherein the photoresist is NR5-8000.

4. The visible light-transparent and radiative-cooling multilayer film of claim 1, wherein:
the photoresist has a refractive index of n1 in visible band, wherein 1.35≤n1≤1.8.

5. The visible light-transparent and radiative-cooling multilayer film of claim 1, wherein:
the indium tin oxide has a refractive index of n2 in visible band, wherein 1.7≤n2≤2.1.

6. The visible light-transparent and radiative-cooling multilayer film of claim 1, wherein:
each of the layers of first films and the layers of second films has a different thickness from each other.

\* \* \* \* \*